Patented Feb. 4, 1936

2,029,961

UNITED STATES PATENT OFFICE 2,029,961

PROCESS OF WATER PURIFICATION

Oliver M. Urbain, Columbus, Ohio, assignor to Charles H. Lewis, Harpster, Ohio

No Drawing. Application July 28, 1934, Serial No. 737,475

3 Claims. (Cl. 210—2)

This invention relates to an improvement in processes of water purification.

It has as its object the provision of a simple expedient process for eliminating or removing carboxylic acids from water in which they are in solution.

Specifically, the process contemplates reacting with the carboxylic acids in solution a reagent which will form therewith addition compounds that are either unobjectionable or insoluble and removable by sedimentation.

The carboxylic acids which it is the purpose of the process to eliminate or remove conform to the following general formula and definition:

General formula is

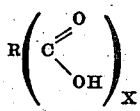

R=any hyrocarbon radical, substituted or unsubstituted by any group or groups.

X=one (1) or more.

The reagents that are employed in accordance with the process of this invention to effect elimination or removal of the carboxylic acids are those reagents belonging to the group that I identify as the "acidic amine salt type" of reagents.

This group includes salts of amino acids. They may be the inner type salts or the salts of the acid part of the molecule, or they may be the salts of the amine part of the molecule, or they may be salts of both the acid and amine parts of the molecule. Examples are,—

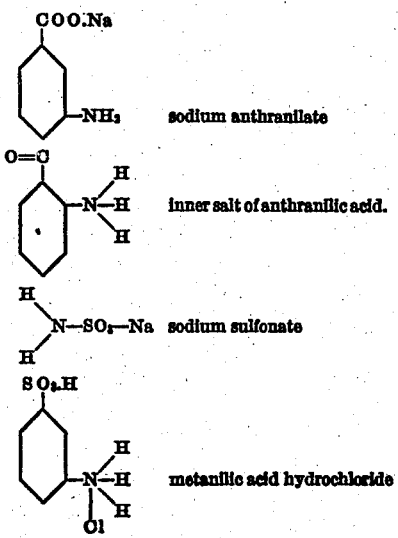

sodium anthranilate inner salt of anthranilic acid.

sodium sulfonate metanilic acid hydrochloride

The reagents of the "acidic amine salt group" react with the carboxylic acids to form addition compounds. Examplary reactions are as follows:—

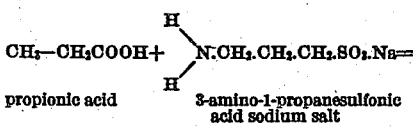

propionic acid    3-amino-1-propanesulfonic acid sodium salt

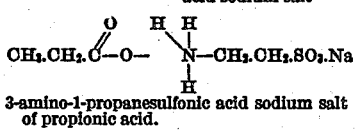

3-amino-1-propanesulfonic acid sodium salt of propionic acid.

These reactions take place at all pH's below pH 7.0. Should it be necessary to increase the pH of the reaction medium above pH 7.0 for any purpose whatsoever after the above reaction has taken place, say with calcium hydroxide, the end product of the above reaction will react with the $Ca(OH)_2$ and the new end product will be, for example, the following:

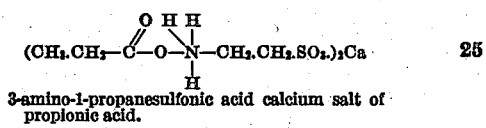

3-amino-1-propanesulfonic acid calcium salt of propionic acid.

The process is carried out by first adjusting the pH of the solution to bring it below pH 7 though this is not an essential if for other reasons it is essential to operate at a higher pH.

The reagent is introduced to the solution and the same agitated for a brief period. The product of the reaction will of course vary depending upon the pH of the solution but in any instance it is removed or is of an unobjectionable character.

The term "inner salt" as employed in the claims is intended to define a salt regarded as formed by reaction within the molecule of a compound having both acid and basic properties.

Having thus described my invention, what I claim is:—

1. A process for eliminating carboxylic acids from water in which they are in solution comprising reacting therewith a reagent of the acidic amine salt group.

2. A process for eliminating carboxylic acids from water in which they are in solution comprising reacting therewith an inner salt of an amino acid.

3. A process for eliminating carboxylic acids from water in which they are in solution comprising reacting therewith the inner salt of anthranilic acid.

OLIVER M. URBAIN.